United States Patent [19]
Miyamoto

[11] Patent Number: 5,180,108
[45] Date of Patent: Jan. 19, 1993

[54] TRUCK WITH A POWER SPRAY DEVICE
[75] Inventor: Yasuhiko Miyamoto, Ohmiya, Japan
[73] Assignee: Fuji Jukogyo Kabushiki Kaisha, Tokyo, Japan
[21] Appl. No.: 628,934
[22] Filed: Dec. 14, 1990

Related U.S. Application Data

[63] Continuation-in-part of Ser. No. 428,341, Oct. 27, 1989, abandoned.

[30] Foreign Application Priority Data

Oct. 31, 1988 [JP] Japan .................. 63-142183[U]

[51] Int. Cl.⁵ .............................. B60P 3/30
[52] U.S. Cl. .................. 239/172; 239/289; 180/69.6
[58] Field of Search ............ 239/172, 289; 169/24; 180/69.4, 69.6; 123/510

[56] References Cited

U.S. PATENT DOCUMENTS

| | | | |
|---|---|---|---|
| 2,210,934 | 8/1940 | Gleason | 239/172 |
| 2,378,810 | 6/1945 | Thornton | 180/69.6 |
| 3,219,275 | 11/1965 | Green | 239/172 |
| 3,372,875 | 3/1968 | Torrey | 239/289 |
| 3,770,060 | 11/1973 | Forsyth et al. | 239/172 |
| 4,181,315 | 1/1980 | van der Lely | 180/69.6 |
| 4,186,885 | 2/1980 | Christian | 239/172 |
| 4,236,673 | 12/1980 | Lake | 239/172 |
| 4,593,855 | 6/1986 | Forsyth | 169/24 |
| 4,830,421 | 5/1989 | Hawelka et al. | 169/24 |

FOREIGN PATENT DOCUMENTS 62-20741  1/1987  Japan .

Primary Examiner—Andres Kashnikow
Assistant Examiner—Karen B. Merritt
Attorney, Agent, or Firm—Martin A. Farber

[57] ABSTRACT

A power spray device mounted on a truck comprises a pumping device for chemicals or water to be sprayed, and an engine for driving the pumping device. The power spray device is mounted on the underside of the loading platform at one side of the loading platform. The engine is operated with fuel supplied from a fuel supply system of an engine for driving the truck.

3 Claims, 3 Drawing Sheets

TRUCK WITH A POWER SPRAY DEVICE

RELATED APPLICATION

This is a continuation-in-part application of my co-pending U.S. patent application Ser. No. 07/428,341 filed Oct. 27, 1989, now abandoned.

BACKGROUND OF THE INVENTION

The present invention relates to a truck having a power spray device for spraying chemicals or water.

There are some types of truck-mounted sprayers for spraying chemicals or water with a spray device mounted on a vehicle.

Japanese Patent Application Laid-Open 62-20741 discloses a sprinkler, as one of the types, which comprises an engine mounted on a front portion of a vehicle body, a transmission mounted on a rear portion of the vehicle body, and a spray device mounted on the rearmost portion of the vehicle body.

In another type, a spray unit comprising a power spray, a fluid tank for chemicals or water, and a hose reel device are mounted on a loading platform of a truck.

In the former sprayer, since the spray device is mounted on the vehicle, a spraying operation is effectively performed. However, the vehicle can not be used for carrying goods.

In the latter sprayer, when spraying, the spray unit must be mounted on the truck, which requires time and labor. Further, if the truck is small in size, it is difficult to provide a large space for the fluid tank. Accordingly, another tank having a small capacity must be inevitably used. Consequently, chemicals or water must be frequently re-supplied to the tank, which results in a reduction in working efficiency. Further, the position of the center of gravity of the truck becomes high, so that stability in driving the truck is reduced.

SUMMARY OF THE INVENTION

The object of the present invention is to provide a truck with a power spray device which may eliminate the above described disadvantages, thereby improving workability of spraying operation and stability of the truck.

According to the present invention, there is provided a frame secured to an underside of the loading platform, a power spray device securely mounted on the frame, the power spray device including a pumping means for chemicals or water to be sprayed and an engine operatively connected to the pumping means for driving the pumping means, and fuel supply means for supplying fuel from the truck to the engine of the power spray device.

In an aspect of the invention, the power spray device is disposed on one side of the loading platform.

Other objects and features of this invention will become understood from the following description with reference to the accompanying drawings.

DETAILED DESCRIPTION OF THE PREFERRED EMBODIMENT

Figure 1:
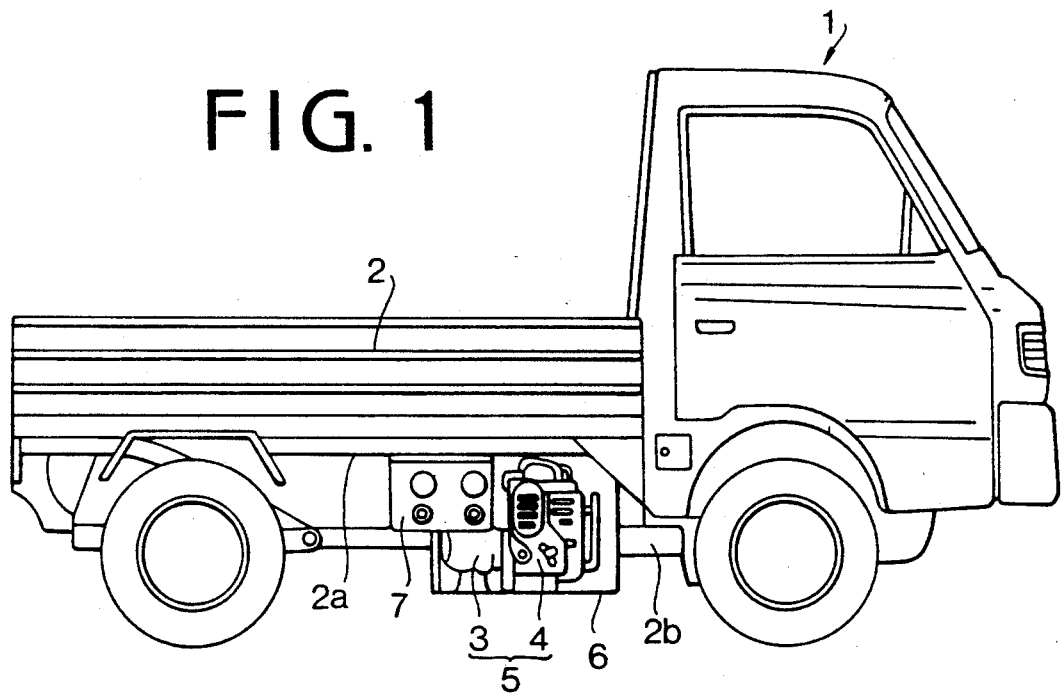
FIG. 1 is a side view showing a truck with a power spray device according to the present invention.
Figure 2:
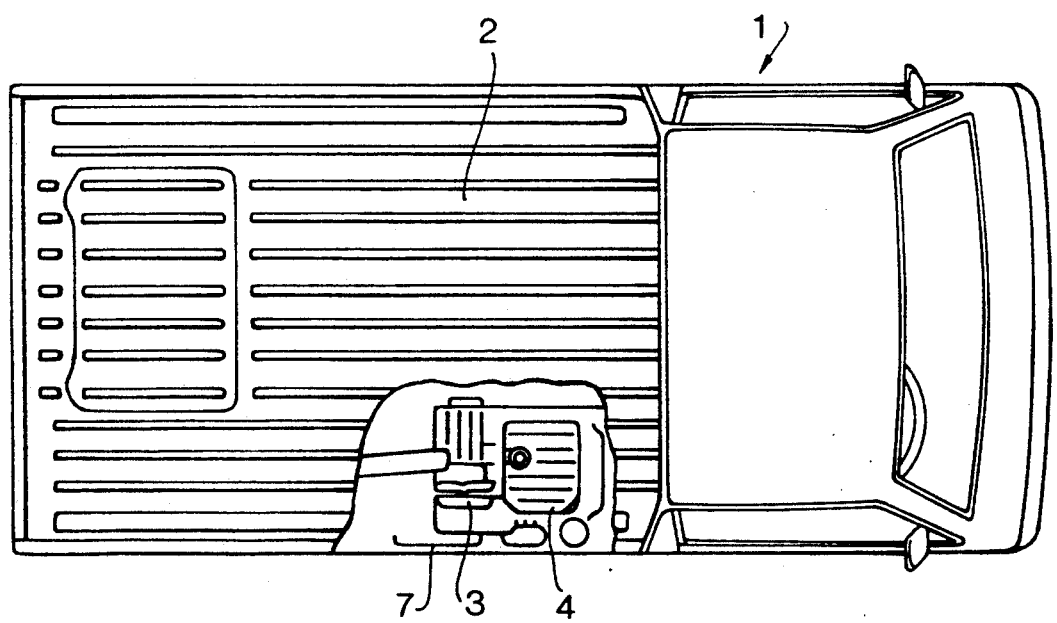
FIG. 2 is a plan view of the truck, a part of which is broken away.

Referring to FIGS. 1 and 2, a truck 1 has a rear body 2 having a loading platform 2a. A power spray device 5 is mounted on the underside of the loading platform 2a. The power spray device 5 comprises a pumping device 3 and an engine 4 for operating the pumping device 3 which are securely mounted on a frame 6. The frame 6 is secured to the underside of the platform 2a or a vehicle body frame 2b, thereby mounting the power spray device 5 on the truck 1.

Figure 3:
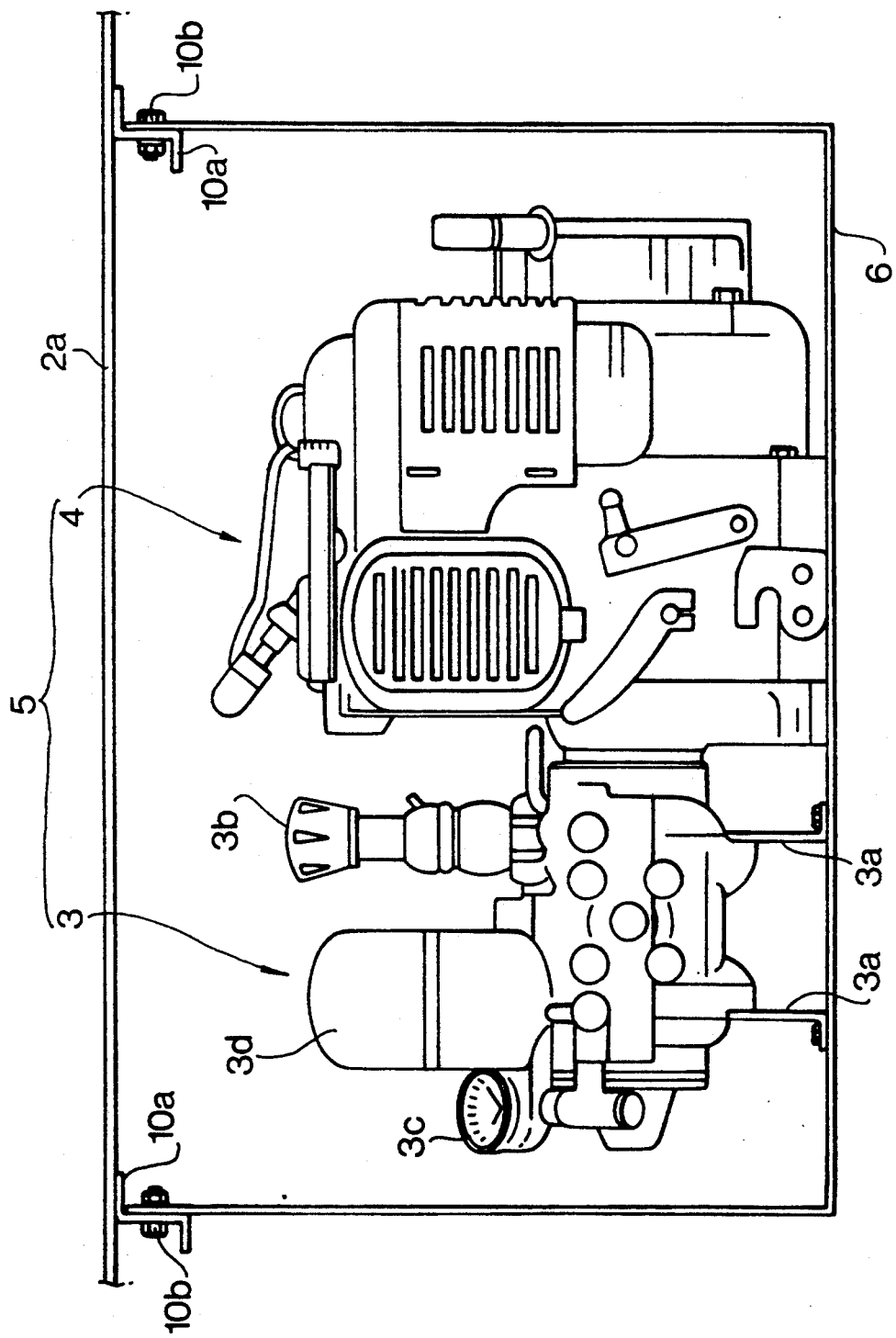
FIG. 3 is an enlarged side view of the power spray device.
Figure 4:
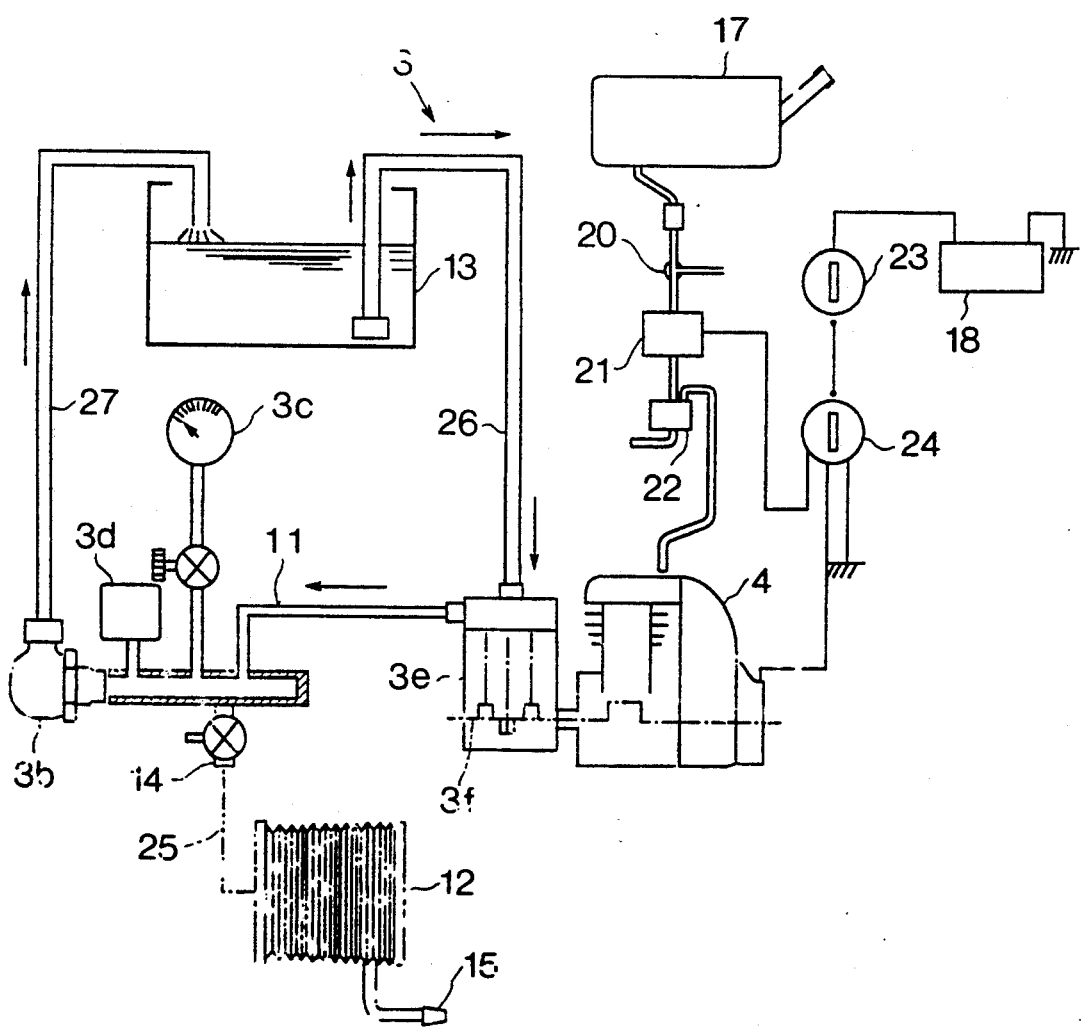
FIG. 4 is a schematic illustration of a fluid system provided in the truck.

Referring to FIG. 3, the pumping device 3 is secured to the frame 6 through stays 3a, and the frame 6 is secured to the loading platform 2a by brackets 10a and bolts 10b. The engine 4 is secured to the frame 6 by bolts (not shown). Referring to FIG. 4, the power of the engine 4 is transmitted to a crankshaft 3f of a pump 3e through a reduction device of the engine 4. The pumping device 3 comprises a pressure regulator valve 3b for regulating the spray pressure applied from the pump 3e passing through a discharge pipe 11, a pressure gauge 3c for indicating the spray pressure, and a surge tank 3d for maintaining a stationary load of the pumping device 3.

Fuel for the engine 4 is supplied from a fuel tank 17 for an engine for driving the truck 1. Thus, a fuel tank for the engine 4 is omitted. A source for the engine 4 and a controller for operating the pumping device 3 uses a battery 18 of the truck 1, so that the power spray device 5 becomes compact in size, thereby ensuring a maximum road clearance of the truck. The power spray device 5 is further provided with a control board 7 mounted on a side portion at the underside of the rear body 2 (FIGS. 1 and 2) for controlling the starting and stopping of the engine 4, the speed of the engine 4, and setting the spray pressure.

Fuel in the fuel tank 17 is selectively supplied to the engine of the truck 1 and the engine 4 of the spray device 5 by operating a three-way valve 20. The fuel is supplied to the engine 4 by a fuel pump 21 through a fuel cock 22.

When spraying, the hose reel 12 and a fluid tank 13 are mounted on the loading platform 2a of the truck 1. The hose reel 12 is connected to the coupling 14 through a hose 25. The fluid tank 13 is connected to the pump 3e through a supply hose 26 and to the pressure regulator valve 3b by a return hose 27. An accessory switch 23 of the truck 1 is closed, and then a key switch 24 of the spray device 5 is closed, so that the engine 4 is started to operate the pump 3e. The fluid in the tank 13 is passed to the hose of the hose reel 12 through the supply hose 26, pipe 11 and hose 25 by the pump 3e, and ejected from the nozzle 15. Remaining fluid is returned to the tank 13 passing through the return hose 27. If necessary, the spraying operation is performed while the truck 1 runs.

When the truck 1 is used for carrying goods and materials, only the hose reel 12 and the fluid tank 13 are removed from the loading platform 2a.

When the power spray device 5 or the truck 1 is checked or inspected, the power spray device 5 is removed from the truck 1. Thus, inspection can be easily performed.

In accordance with the present invention, a power spray device is installed in a truck at the underside of a floor of a rear body of the truck. Accordingly, when the truck is used for carrying goods or used as a sprinkler, it is unnecessary to remove the power spray device from the truck or mount the device on the truck. Further, a large space for the liquid tank is provided on the rear body. Accordingly, working efficiency is increased. Since the center of gravity of the truck can be lowered, stability of the truck in driving is improved. Furthermore, the power spray device is mounted on the side portion of the truck, so that the device can be easily handled and inspected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A truck having a first engine for driving wheels of the truck, a fuel tank for providing fuel for the first engine and a loading platform, comprising:
   a frame secured to an underside of the loading platform;
   a power spray device securely mounted on the frame for fluid comprising fluid-like chemicals and water;
   the power spray device comprises:
   pumping means for pumping said fluid and for providing a pumped fluid; and
   a second engine operatively connected to and driving said pumping means;
   a fluid tank adapted to contain said fluid and removably mounted on said loading platform;
   means connected to said fluid tank and said pumping means for supplying said fluid to said pumping means;
   hose reel means removably mounted on said loading platform and connectable to said pumping means for spraying said pumped fluid; and
   fuel supply means connected to the fuel tank and the second engine for supplying fuel from the fuel tank to the second engine so as to improve workability of spraying operation and driving stability of the truck.

2. The truck according to claim 1 wherein the power spray device is disposed on one side of the loading platform.

3. A truck having a fuel supply system which supplies fuel to an engine of the truck, a loading platform and a vehicle body frame, comprising:
   another frame secured to said vehicle body frame under the loading platform;
   a power spray device securely mounted on said another frame;
   the power spray device including a pumping means for chemicals or water to be sprayed, and an engine operatively connected to the pumping means for driving the pumping means; and
   fuel supply means for supplying fuel from the fuel supply system of the truck to the engine of the power spray device.

* * * * *